Sept. 20, 1949.　　　　　F. J. LINGEL　　　　　2,482,281
EXPOSURE METER HAVING ADJUSTABLE INTERCONNECTED
PHOTOCELL SHUTTER AND POINTER BIASING MEANS
Filed Oct. 11, 1947
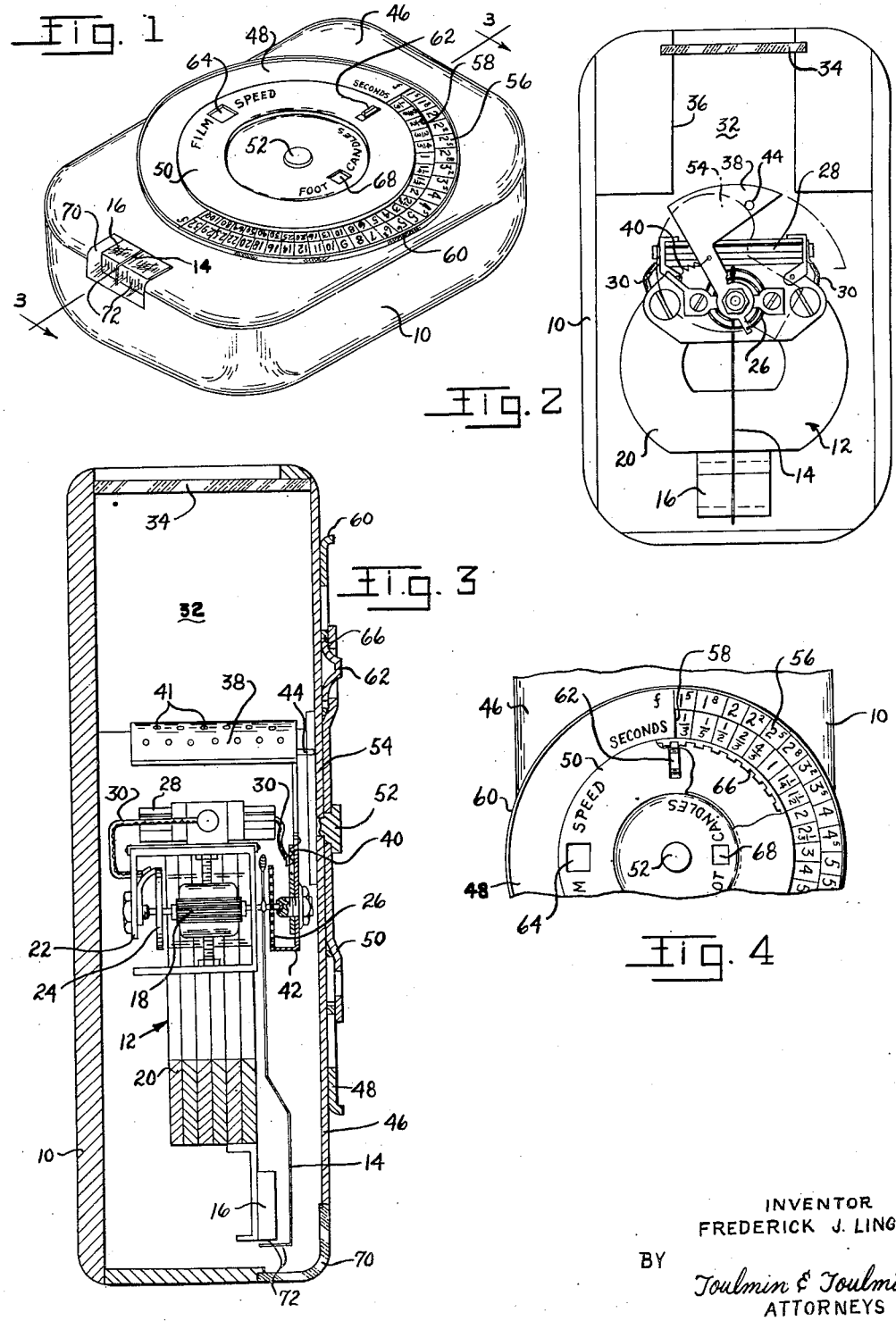
INVENTOR
FREDERICK J. LINGEL
BY
Toulmin & Toulmin
ATTORNEYS Patented Sept. 20, 1949

2,482,281

UNITED STATES PATENT OFFICE 2,482,281

EXPOSURE METER HAVING ADJUSTABLE INTERCONNECTED PHOTOCELL SHUTTER AND POINTER BIASING MEANS

Frederick J. Lingel, Bluffton, Ohio, assignor to The Triplett Electrical Instrument Company, Bluffton, Ohio, a corporation of Ohio Application October 11, 1947, Serial No. 779,330

4 Claims. (Cl. 88—23)

This invention relates to light measuring devices, and particularly to light measuring devices or exposure meters for use in photography.

The usual type exposure meter for use in photography includes an indicating instrument connected in circuit with a photovoltaic cell and having a chart or indicating means by which the reading of the indicator instrument can be employed for determining the proper exposure time in seconds for any given aperture opening of a camera. Usually it is necessary to employ a separate chart for each type film, or to refer to another schedule for modifying the aperture, time ratio for different emulsion speeds.

The usual type exposure meter for use in photography employs a calibrated dial over which the pointer of the indicator moves and which indications are printed in the above mentioned schedule. In the applicant's Patent 2,329,630 issued September 14, 1943, there is shown an exposure meter operating on the null indication principle. An arrangement of this type is to be preferred because greater accuracy in the reading and simplicity in using the device is obtained. However, in the device shown in the patent referred to above, it is necessary to employ separate charts for films having different emulsion speeds, or to transfer reading from one chart to another.

The primary object of the present invention is to provide an improved type exposure meter for use in photography which is much more convenient and rapid to use than instruments manufactured heretofore.

Another object of this invention is the provision of an exposure meter which is extremely easy to read.

It is also an object of this invention to provide an exposure meter for use in photography in which a single calculator is employed for indicating exposure time and aperture openings and which includes means for adjusting the calculator to accommodate the different film speeds.

A still further object of this invention is the provision of an exposure meter in which the amount of light incident on the photovoltaic cell is regulated by a masking device automatically movable over the said cell.

A still further object is the provision of a null indicator type exposure meter which includes means for reducing the light incident on the photovoltaic cell in proportion to the adjustment required to restore the pointer of the indicator to its null point.

It is also an object to provide an exposure meter especially adapted for use in photography which is compact and therefore easily portable, and which is complete in including a calculator for giving exposure times and aperture openings for all film speeds.

These and other objects and advantages will become more apparent upon reference to the following description taken in connection with the accompanying drawings in which:

Figure 1 is a perspective view showing a photographic exposure meter constructed according to this invention;

Figure 2 is a front elevation of the instrument shown in Figure 1 but having the cover removed therefrom to show the arrangement of the photovoltaic cell, the shutter therefor and the indicating instrument;

Figure 3 is a somewhat enlarged vertical section taken through the instrument and showing the construction of the indicating dial and calculator; and Figure 4 is a partial front elevation showing the construction of a catch for interlocking the inner and outer dials of the calculator.

Referring to the drawings, the instrument of this invention comprises a body or frame part 10 within which is mounted a galvanometer 12 which includes a movable pointer 14 adapted to sweep over the short dial member 16.

In Figures 2 and 3 it will be observed that the pointer 14 is mounted on the coil bobbin 18 of a moving coil type galvanometer which includes the magnet 20. The coil arrangement 18 is mounted on pivot shafts which are journaled in jeweled screws mounted in the movement frame 22.

In the usual manner, the movement of the galvanometer includes the adjustable hair springs 24 and 26 which are employed for the purpose of calibrating the movement and for restoring the pointer to its null indicating position.

As will be seen in Figure 3, there is mounted on one side of the galvanometer 12 a photovoltaic cell 28 which has its opposite terminals connected, as by the wires 30, with the coil of the galvanometer through the hair springs 24 and 26. The upper activated side of the photovoltaic cell 28 is exposed to outside light through the opening 32 in the body 10 which is preferably closed by a cover glass 34. The opening 32 is preferably formed to have sidewalls 36 which operate to guard the photovoltaic cell against stray light.

Mounted to pivot about the axis of the journal screw adjacent the hair spring 26 is a shutter 38 which is biased by a spring 40 toward the position shown in Figure 3 wherein it lies substantially completely over the cell 28. As will be seen in Figure 3, the shutter 38 has a plurality of apertures 41 therein which permits some light to pass through the shutter to the photo cell. These apertures are preferably distributed over the entire area of the shutter and prevent the entire cell from being shielded thereby. Also, the under part of the shutter, that is, the side toward the cell, is either polished or painted a light color in order to diffuse the light over the entire surface of the photo cell.

The purpose of the shutter 38 is to reduce the amount of light falling on the photo cell when intensity of illumination is very high. This helps extend the range of the exposure meter and reduces possibility of cell damage on high light intensities.

In connection with the shielding of the light from the cell the apertures 41 operate to prevent any great reduction or variation in the meter acceptance angle as the shutter is moved into masking position.

The end of the shutter on the other side of the screw about which it pivots is turned down as at 42 and has connected therewith the end of the hair spring 26. Thus, as the shutter 38 is moved about its pivotal support it also adjusts the bias of the hair spring 26.

The hair spring 26 is arranged such that movement of the shutter to cover the photovoltaic cell more completely will adjust the bias on the spring in a direction to return the pointer 14 to its null position after it has been deflected by an increase in illumination of the cell.

For moving the shutter 38 it carries a pin 44 projecting therefrom toward the front side of the body 10 of the instrument. The front of the instrument is closed by a cover plate 46 and centrally mounted on said cover plate are a pair of disc members 48 and 50.

The disc member 50 is mounted on a pivot pin 52 that extends through the cover 46 and has connected on its inner end a cam member 54, the shape of which is indicated in dashed outline in Figure 2. The cam member 54 is positioned to bear against the pin 44 and as the said cam is rotated its configuration brings about movement of the shutter 38 to cover more or less of the cell 28.

Referring to Figures 1 and 3 it will be seen that the outer disc 48 has imprinted, stamped, or etched thereon an "f" scale at 56 which is an indication of the aperture openings to which a camera can be adjusted. Adjacent the "f" scale on the disc 48 is an arcuate cut-out portion 58 which exposes a portion of the cover 46. The portion of the cover exposed through the cut-out 58 has marked thereon, as by etching or stamping, a seconds scale which indicates the time of exposure to be given. The edge of the dial 48 is preferably flanged upwardly and knurled as at 60 and projects somewhat beyond the body 10 of the instrument at each side to provide for ease in adjusting the dial 48 angularly.

The outer dial 48 is adapted for being latched to the inner dial 50 by means of the slide catch 62 seen in Figures 1, 3 and 4. For predetermining the relative positions of the dials 48 and 50, the inner dial 50 has a cut-out part at 64 which is marked "film speed" and through which a portion of the surface of the outer dial 48 can be observed.

On the dial 48 which can be viewed through the cut-out part 64 there are marked the several film or emulsion speeds which characterize commercial films. By releasing the slide catch 62 from one of the notches 66 now shown in Figure 4, the dials can be adjusted relatively to any predetermined position determined upon the emulsion speed of the film being used and the slide catch 62 thereafter shifted to again interlock the dials.

The inner dial 50 may also have a cut-out part thereon as at 68 through which a portion of the cover 46 is visible and through which indications on the cover correspondingly to the foot candles of illumination falling on the cell can be read.

In operation, the dials 48 and 50 are first adjusted so that the proper film speed is showing through the cut-out 64. Thereafter the dials are locked together by the slide catch 62 and the instrument is placed so the light which is falling on the object to be photographed is directed through the cover glass 34 and opening 36 to the cell 28. The illumination falling on the cell 28 will activate the galvanometer 12 and cause the pointer 14 thereof to deflect over the dial 16. The deflections of the pointer 14 are observed through a window 70 at the end of the instrument opposite the opening 32. It will be noted that the window 70 is preferably formed partly in the front face of the instrument and partly in the bottom thereof, and that the pointer and dial are likewise angularly formed as indicated at 72 in Figure 1. This permits observation of the instrument from either the front or bottom thereof and greatly facilitates its use.

After the instrument has been placed so that light incident thereon is the same as that falling on the object to be photographed, the dials 48 and 50 are adjusted by the knurled edge 60 until the pointer 14 returns to its mid-position on the dial 16. This will provide for a certain alignment of the "f" and seconds scales and the exposure time for any given aperture opening can be read directly from the seconds dial on the cover 46. Inasmuch as the dials 48 and 50 were preset to the proper film speed, it will be evident that there need be no further calculating of exposure time and aperture openings.

During the rotation of the dial 48 and 50 to bring the pointer 14 back to its null position, the shutter 38 is actuated to cover or uncover the cell 28 depending on the intensity of the incident illumination. The arrangement is such that wide variations in luminous intensity can be measured but without harmfully overloading either the photovoltaic cell or the delicate galvanometer movement.

It will be apparent that the shutter 38, since it is essentially a light shield, could be formed of a translucent or opalescent glass or plastic and fully equivalent results would obtain.

From the foregoing it will be seen that this invention provides for an exposure meter which is very simple to use and which, by a single predetermined adjustment, performs all the necessary calculations thereby avoiding the transferring of a reading from one part of a chart or calculator index to another. By the arrangement of the indicating pointer and window around one corner of the instrument, the use thereof is greatly facilitated. Also, the intensity of illumination which can be accurately measured by the instrument of this invention is greatly increased by the use of a shutter member which interrupts at least a portion of the illumination directed to the photo cell as the pointer of the indicator is biased toward its null position.

It will be understood that this invention is susceptible to modification in order to adopt it to different usages and conditions and, accordingly, it is desired to comprehend such modifications within this invention as may fall within the scope of the appended claims.

I claim:

1. In an exposure meter; a case, an electrical movement including a coil and a pointer carried thereby mounted in said case, a photovoltaic cell mounted in said case and connected with said coil, an opening in said case through which light passes to said cell, a shutter mounted in said case and on said movement and movable for varying the area of the cell exposed to said opening, a biasing spring in said movement adjustable for biasing said pointer toward null indicating position, a connection between said shutter and biasing spring whereby adjustment of the former will also adjust the latter, resilient means acting on said shutter to move it toward one of its extreme positions, a cam carried by said case and engaging said shutter for moving it in the opposite direction, and dial means carried on said case and connected with said cam for effecting adjustments of said shutter and spring means from externally of said case.

2. In an exposure meter; a case having mounted therein an electrical movement having a pointer and a photovoltaic cell connected to energize said movement, a hair spring for biasing the pointer of said movement toward null indicating position and a shutter connected with said hair spring movable for masking a portion of said cell, a cam carried by said case movable for adjusting the position of said shutter and therethrough the setting of said hair spring, a first dial mounted on the face of said case and connected with said cam, a second dial mounted about said first dial, indicia on said first and second dials where they may be set relatively to indicate emulsion speed, and indicia on said second dial and the face of said case whereby adjustment of said dials to bias said pointer to null indicating position will give an indication of shutter speed and aperture opening.

3. In an exposure meter; a case having mounted therein an electrical movement having a deflecting pointer and a photovoltaic cell connected with said movement, a shutter in said case movable for partially masking said cell, resilient means in said movement for opposing the deflection of said pointer, said resilient means having a direct connection with said shutter to move the former when the latter is moved, cam means in said case for adjusting the masking position of said shutter, and dial means carried on the outside of said case and connected with said cam, whereby said dial means effects adjustments of said shutter and resilient means from externally of said case.

4. In an exposure meter; a case having mounted therein an electrical movement having a deflecting pointer and a photovoltaic cell connected with said movement, a shutter in said case movable for partially masking said cell, resilient means in said movement for opposing the deflection of said pointer, said resilient means having a direct connection with said shutter to move the former when the latter is moved, cam means in said case for adjusting the masking position of said shutter, and dial means carried on the outside of said case and connected with said cam, whereby said dial means effects adjustments of said shutter and resilient means from externally of said case, said dial means comprising a pair of relatively movable discs angularly adjustable for different film emulsion speeds, and one of said discs and said case bearing cooperating indicia for indicating aperture opening and shutter speed.

FREDERICK J. LINGEL.

REFERENCES CITED

The following references are of record in the file of this patent:

UNITED STATES PATENTS

| Number | Name | Date |
| --- | --- | --- |
| 2,194,031 | Riszderfer | Mar. 19, 1940 |
| 2,242,043 | Sanger et al. | May 13, 1941 |
| 2,274,441 | Williams | Feb. 27, 1942 |
| 2,305,294 | Kuppenbender | Dec. 15, 1942 |
| 2,329,630 | Lingel | Sept. 14, 1943 |
| 2,346,483 | Goss | Apr. 11, 1944 |
| 2,381,329 | Young et al. | Aug. 7, 1945 |
| 2,433,648 | Clark | Dec. 30, 1947 |

FOREIGN PATENTS

| Number | Country | Date |
| --- | --- | --- |
| 801,847 | France | Aug. 19, 1936 |
| 827,027 | France | Apr. 14, 1938 |